(12) United States Patent
Sekanina et al.

(10) Patent No.: US 10,357,952 B2
(45) Date of Patent: Jul. 23, 2019

(54) CUTTING TOOL GUIDE STRUCTURE AND METHOD OF CUTTING ADHESIVE-BACKED FILM APPLIED TO A SURFACE OF A VEHICLE

(71) Applicant: 3M INNOVATIVE PROPERTIES COMPANY, St. Paul, MN (US)

(72) Inventors: Martin Sekanina, Karlik (CZ); Lukas Marsoun, Zdar nad Sazavou (CZ); Rudolf Melezinek, Prague (CZ); Jiri Cerny, Zbraslav (CZ)

(73) Assignee: 3M Innovative Properties Company, St. Paul, MN (US)

( * ) Notice: Subject to any disclaimer, the term of this patent is extended or adjusted under 35 U.S.C. 154(b) by 52 days.

(21) Appl. No.: 15/119,890

(22) PCT Filed: Feb. 23, 2015

(86) PCT No.: PCT/US2015/017065
§ 371 (c)(1),
(2) Date: Aug. 18, 2016

(87) PCT Pub. No.: WO2015/127350
PCT Pub. Date: Aug. 27, 2015

(65) Prior Publication Data
US 2017/0057212 A1    Mar. 2, 2017

(30) Foreign Application Priority Data

Feb. 24, 2014 (EP) ..................................... 14156412

(51) Int. Cl.
*B29C 63/00* (2006.01)
*B32B 38/00* (2006.01)
(Continued)

(52) U.S. Cl.
CPC .......... *B32B 37/12* (2013.01); *B29C 63/0004* (2013.01); *B29C 63/02* (2013.01);
(Continued)

(58) Field of Classification Search
CPC ..... B26B 29/06; B29C 63/0004; B29C 63/02; B32B 38/0004; Y10T 156/1057
See application file for complete search history.

(56) References Cited

U.S. PATENT DOCUMENTS 6,371,186 B1    4/2002  Koizumi et al.
6,699,346 B1 *  3/2004  Habistreitinger ....... B29C 63/02
                                                    156/212
(Continued)

FOREIGN PATENT DOCUMENTS

CN    102602732    10/2012
DE    19606395     10/1997
(Continued)

OTHER PUBLICATIONS

International Search Report for International Application No. PCT/US2015/017065 dated Apr. 13, 2015, 3 pages.

*Primary Examiner* — Mark A Osele
*Assistant Examiner* — Christopher C Caillouet
(74) *Attorney, Agent, or Firm* — Philip P. Soo; Harold C. Knecht, III

(57) ABSTRACT

Cutting tool guide structure (1) for the cutting of an adhesive-backed film partially applied to a surface of a vehicle. The cutting tool guide structure (1) is removably attachable to a surface of a vehicle, contains a cutting slit (4) for receiving a cutting tool (6), and is dimensioned such that the cutting tool can be moved back and forth in one direction within the cutting slit (4) to carry out a cutting action. The guide structure (4) further comprises, at opposite ends, engaging areas (2) that are shaped and configured to match
(Continued)

opposite surface areas (5) of the vehicle such that the cutting tool guide structure (1) can be placed with its engaging areas on the surface areas of the vehicle to provide an abutting fit. Further provided are methods of applying an adhesive-backed film to the surface of a vehicle and cutting the film to fit the surface, using the cutting tool guide structure.

18 Claims, 2 Drawing Sheets

(51) Int. Cl.
  *B32B 37/12* (2006.01)
  *B29C 63/02* (2006.01)
  *B32B 37/06* (2006.01)
  *B60R 13/04* (2006.01)
  *B62D 65/02* (2006.01)
  *B29L 31/30* (2006.01)
(52) U.S. Cl.
  CPC .......... *B32B 37/06* (2013.01); *B32B 38/0004* (2013.01); *B60R 13/04* (2013.01); *B62D 65/024* (2013.01); *B29C 2793/0036* (2013.01); *B29L 2031/30* (2013.01); *B29L 2031/3055* (2013.01); *B32B 2605/08* (2013.01)

(56) References Cited

U.S. PATENT DOCUMENTS

| | | | |
|---|---|---|---|
| 7,459,051 | B2 | 12/2008 | Habisreitinger |
| 2006/0169393 | A1 | 8/2006 | Botts et al. |
| 2006/0169398 | A1 | 8/2006 | Haibistritinger |
| 2007/0215272 | A1* | 9/2007 | Taylor ............... B26B 29/06 156/250 |
| 2007/0227645 | A1 | 10/2007 | Habisreitinger |

FOREIGN PATENT DOCUMENTS

| | | |
|---|---|---|
| DE | 202 10 676 | 11/2002 |
| EP | 0932149 | 7/1999 |
| EP | 2226183 | 9/2010 |
| FR | 2790922 | 9/2000 |
| JP | 9-226007 | 9/1997 |
| JP | 2000-318712 | 11/2000 |
| WO | WO 92/11129 | 7/1992 |
| WO | WO 01/05902 | 1/2001 |
| WO | WO 2005/021241 | 3/2005 |
| WO | WO 2014/209928 | 12/2014 |

* cited by examiner

CUTTING TOOL GUIDE STRUCTURE AND METHOD OF CUTTING ADHESIVE-BACKED FILM APPLIED TO A SURFACE OF A VEHICLE

CROSS REFERENCE TO RELATED APPLICATIONS

This application is a national stage filing under 35 U.S.C. 371 of PCT/US2015/017065, filed Feb. 23, 2015, which claims the benefit of European Application No. 14156412.0, filed Feb. 24, 2014, the disclosures of which are incorporated by reference in their entireties herein.

FIELD

The invention relates to a cutting tool guide structure allowing for precise cutting of films applied to a surface of a vehicle and to a method of cutting an adhesive-backed film applied to a surface of a car using the cutting tool guide structure.

BACKGROUND

Recently it has become popular to use different paint colors on the bodywork of motor vehicles like passenger cars. For example cars are desired having a black colored roof while the remainder of the bodywork of the car has a different color. The application of different colors requires two subsequent lacquering processes. In the first step a first lacquer is applied on the entire bodywork of the vehicle. The first lacquer layer has to dry before the second lacquer layer can be applied onto the first lacquer layer. This operation takes a long time and therefore is expensive. Instead of different layers of lacquering appropriately colored polymeric films that can be adhesively attached to the respective portions of the bodywork of a vehicle may be used to provide different colors.

Methods and equipment for applying films to portions of the bodywork of a vehicle and, in particular, to the roof of a car are known in the prior art. The films may be applied to the car surface and then cut into the final shape, as disclosed, for example in international patent application WO01/05902. Care has to be taken to avoid damage of the underlying lacquer layer during the cutting operation. Alternatively, the films are cut into shape prior to the application to the car roof, for example as disclosed in JPH09226007. However, it has turned out that the handling and precise positioning of pre-cut films may be difficult under industrial manufacturing conditions and also in view of typical manufacturing tolerances.

In U.S. Patent Application No. US2006/0169398 an automated system for applying films and cutting when correctly positioned is described.

However, there is still a need to improve the cutting of films to allow easy and precise cutting of film and avoiding damaging the surface of the vehicle to which the films are to be applied.

SUMMARY

In one aspect of the present invention there is provided a method of applying an adhesive-backed film (e.g., a paint replacement film or paint film) to the surface (3) of a vehicle or motor vehicle (e.g., a passenger car, truck, bus, train, airplane, watercraft, etc.), and cutting the adhesive-backed film using a cutting tool guide structure (1). The cutting tool guide structure (1) can be removably attachable to a surface (3) of the vehicle and comprises at least one cutting slit (4) for receiving a cutting tool (6) and is dimensioned such that the cutting tool (6) can be moved back and forth in one direction within the cutting slit (4) to carry out a cutting action. The guide structure (1) is dimensioned such that it can be placed on or between opposite surfaces (5), (5') of the vehicle. The method comprises:

(i) applying the adhesive-backed film on the surface (3) of the vehicle, wherein the adhesive-backed film extends beyond the surface (3) of the vehicle, wherein the areas of the adhesive-backed film that extend beyond the surface of the vehicle are not to be adhered and are to be cut off;

(ii) placing the cutting tool guide structure (1) on or between the opposite surfaces (5), (5') of the vehicle such that the cutting slit (4) of the cutting tool guide structure (1) is situated underneath an area of the adhesive-backed film that is to be cut off;

(iii) placing the unadhered section of the adhesive-backed film, that is to be cut off, over the cutting slit (4) of the guide structure (1);

(iv) inserting a cutting tool (6) into the cutting slit (4) and cutting off the excess adhesive-backed film by moving the cutting tool (6) along the cutting slit (4), wherein step (i) can be carried out simultaneously with step (ii), prior to step (ii) or after step (ii).

In another aspect of the present invention there is provided a cutting tool guide structure (1) for the cutting of an adhesive-backed film, which is at least partially applied to a surface (3) of a vehicle. The cutting tool guide structure (1) is removably attachable to a surface (3) of the vehicle, includes a cutting slit (4) for receiving a cutting tool (6), and is dimensioned such that the cutting tool (6) can be moved back and forth in one direction within the cutting slit (4) to carry out a cutting action. The cutting tool guide structure can further comprise a protective cutting tool aid, which is to be inserted into the cutting slit, such that it can be moved along the slit in a cutting direction and that further includes at least one aperture dimensioned such that it can receive at least a part of the cutting tool (6).

SHORT DESCRIPTION OF THE FIGURES

Figure 3:
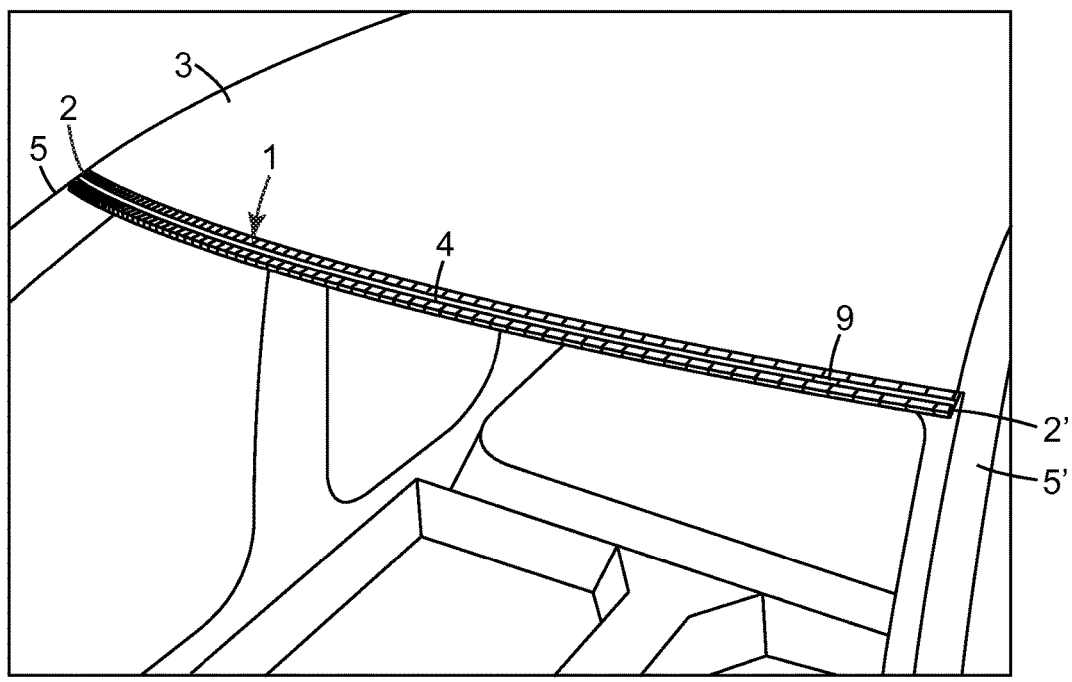

FIG. 3 is a schematic drawing showing an embodiment of the cutting tool guide structure (1) according to the present disclosure. The guide structure is placed between two opposite areas of a car (5), (5') which in this case are the side panels at an area where the roof panel is connected to the window frame. The guide structure (1) contains a protective aid for the cutting tool (9) in the cutting slit (4) of the guide structure (1).

Figure 4:
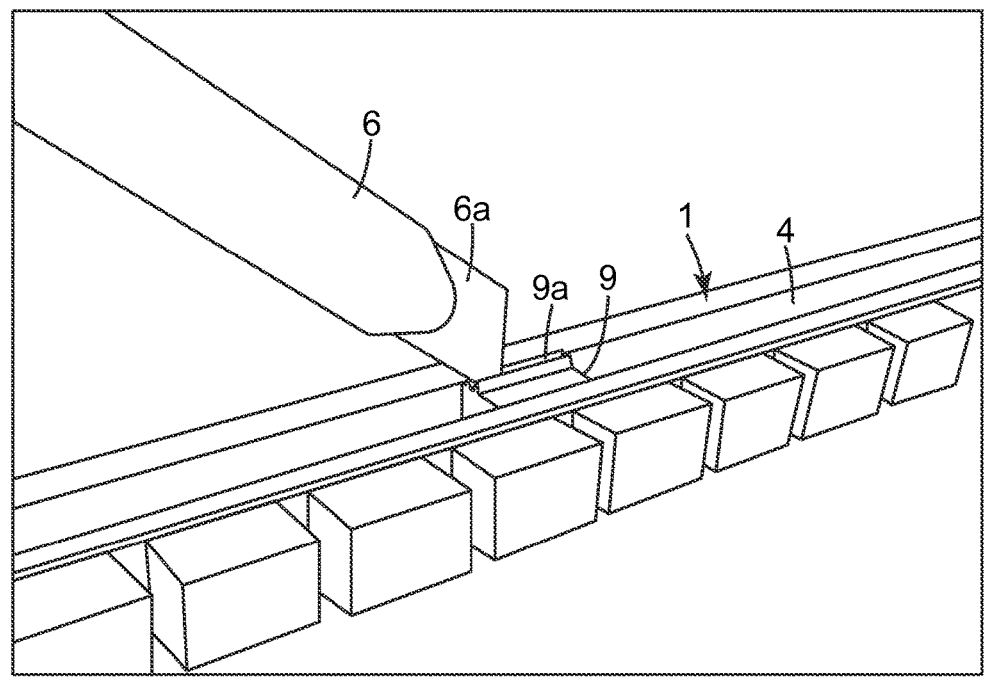

FIG. 4 is an enlarged version of FIG. 3 showing the blade (6a) of the cutting tool (6) being inserted into a receiving aperture (9a) of the protective aid (9).

DETAILED DESCRIPTION

The cutting tool guide structure provided herein allows easy and precise cutting of an adhesive-backed film to be applied to a surface of a vehicle or motor vehicle or that is partially applied to such a surface. The automotive vehicle could be, for example, a car or a truck. Preferably the cutting tool guide structure is placed on the surface of the motor vehicle. This allows the excessive film to be cut off in proximity to the surface of the motor vehicle or even on the surface of the motor vehicle thus reducing the formation of bubbles and cracks on the remaining film or the need of repositioning parts of the already adhered film.

Preferred surfaces include the roof and side panels of a car with the roof panels being most preferred.

The cutting tool guide structure according to the present disclosure can be removably attached to the motor vehicle yet it can be securely attached to the motor vehicle such that it is held in its position. The cutting tool guide structure contains at least one cutting slit. The cutting slit receives a cutting tool for cutting an adhesive-backed film that is to be applied to a surface of the motor vehicle. Preferably, the film is already partially applied to the surface of the motor vehicle. The adhesive-backed film contains excessive parts extending beyond the surface of the motor vehicle that have to be cut off by the cutting tool. Cutting of the film is done by the cutting tool. The cutting tool is moved along within the cutting slit such that the film can be cut precisely giving a smooth cutting line.

The cutting slit of the cutting tool guide structure preferably is dimensioned such that it can receive the cutting tool but only allows movement of the cutting tool back and forth in one direction. In a typical embodiment the cutting slit has a width that is only slightly wider than the width of the cutting tool, which is, for example, a blade. The cutting slit has a length that is at least the length of the surface to which the film is to be applied. This means the cutting slit can be configured and shaped adapted to the geometry of the respective surface of the motor vehicle to which the film is to be applied.

The guide structure may contain a protective guiding aid for the cutting tool. The protective guiding aid may be removably inserted into the cutting slit and can be moved within the cutting slit along the cutting direction of the cutting tool. Typically it is dimensioned that it can receive, preferably also engage, a part of the cutting tool, preferably the part of the cutting tool that faces the cutting slit or the surface of the motor vehicle during the cutting to prevent the cutting tool from cutting into the guide structure, the cutting slit or even the surface of the motor vehicle. For example, the aid may have an aperture that is configured such that it receives, preferably also engages or secures, at least a part of the cutting tool. Instead of engaging or securing mechanically, the cutting tool may be engaged with the protective aid electronically or magnetically—depending on the nature of the cutting tool. The protective guiding aid may be moved with the cutting tool along the cutting direction in the cutting slit during cutting after it received at least a part of the cutting tool.

In one embodiment the protective guiding aid is made of metal.

The guide structure of the present disclosure may be dimensioned and configured such that it can be placed on the surface of a car but between two opposite surfaces of the car. Preferably, the guide structure is dimensioned and configured such that it is held securely between the two opposite surfaces without requiring additional support structure attaching or securing it to the surface of the motor vehicle. The guide structure of the present disclosure may contain at least two engaging areas to place the guide structure on a surface of the motor vehicle or between two opposing surfaces of the motor vehicle.

In one embodiment the guide structure of the present disclosure has an inner surface area facing the surface of the car when attached to the car for the cutting action to be carried out. The guide structure contains at its inner surface at least two engaging areas, preferably at opposite ends to be placed on opposite surfaces of the motor vehicle. Each engaging area is shaped that it matches a surface area of the car, preferably a surface area that is adjacent to the surface to which the adhesive-backed film is to be applied, such that the guide structure can be placed abuttingly with its engaging areas on the respective opposing surfaces of the car, thereby securing the guide structure on the surface of the car. While the guiding tool may be secured to the surface of the car in an abutting position simply by its engaging areas, additional structure for holding or securing the device on the surface of the car may be used although this may not be necessary.

In a particular embodiment the guiding tool is prepared for applying a film on a roof panel of a car. The engaging areas are formed that they match the shape of, preferably opposing, sides of the side panels, or on the front or rear panel of front or rear window frame. The cutting slit extends along the length of the roof panel between the side panels if the film is to be cut off on the front or rear end (tolerance area) of the roof panel. The minimum length of the cutting tool guide structure is the length of the roof panel between the side panels, when the film is cut off at the front or back side of the roof panel. If the film is cut off on the lateral sides of the roof panel the minimum length of the guide structure is the length of the roof panel between the front and rear panel. The guide structure may extend beyond the minimum length and preferably is bent at its exterior ends, which typically form the engaging areas of the guide structure to provide a better fit and hold on the respective opposed surfaces of the motor vehicle.

In another embodiment of the present disclosure the guiding tool contains engaging areas at its opposite ends (lateral ends) that allow the tool to be placed between two opposing surfaces of the motor vehicle and preferably also allow the guiding tool to be held in place between the opposing surfaces of the motor vehicle by providing an abutting fit to these opposite surfaces.

In a particular embodiment the guiding tool is prepared for applying a film on a roof panel of a car. The guiding tool and its engaging areas are formed that they can be placed between the side panels of the motor vehicle that are connected to the roof. The cutting slit extends along the length of the roof panel between the side panels if the film is to be cut off on the front or rear end (tolerance area) of the roof panel. The minimum length of the cutting tool guide structure, in particular its cutting slit, is the length of the roof panel between the side panels, when the film is cut off at the front or back side of the roof panel. The cutting slit may extend beyond the minimum length. The guiding tool may be of a flexible material such that it can be bent around the edge of the roof panel which in most case is curved. The guiding tool may contain additional structure for securing the guiding tool to the surface of the motor vehicle.

The thickness and the height of the guide structure is selected so that it can be easily and securely grasped and handled by an operator or a robot, for example. The height of the guide structure preferably is between 2-25 cm and its width may be between 2-30 cm.

The cutting tool guide structure can be made, for example, by mold forming or casting. It can be made from rubber, for example natural rubber or synthetic rubber, i.e. cross-linked polymers. It can also be made from plastics, i.e. thermoplastic polymers (melt-processable polymers). It may or may not contain reinforcing fibers, for example glass fibers.

In one embodiment cutting tool guide structure and cutting slit form an integral part, for example made from rubber. In this embodiment the cutting slit may be a continuous grove in the rubber body. The protective aid preferably is made from a different material, for example a metal like steel or aluminum. In another embodiment the cutting slit of the guide structure is made from a different material, for example a continuous metal insert in the shape of a grove in a body of rubber or plastic to form the cutting tool guide structure. The materials that are preferred in making the guide structure of the present disclosure have a surface finish such that at least the engaging areas of the guide structure can be placed on surfaces of the car without damaging such surfaces or the guiding tool may contain at least on its external areas exposed to the surface of the motor vehicle padding or other protective materials. The engaging areas may be padded or may be made of a non-scratching material, for example rubber.

The guide structure can be positioned by its engaging areas on the respective surfaces of the motor vehicle by one or more operators or by means of automated equipment such as robot. In a preferred embodiment one or more magnets are arranged within the guide structure so that it can be magnetically secured to the engaging surfaces of the bodywork. The magnet could be an electrical magnet which can be switched on and off to allow easy removal of the guide structure from the surface of the motor vehicle. Alternatively and/or additionally the guide structure can be held in place by a mechanical positioning mechanism, such as mechanical clamps or, preferably vacuum pads.

An adhesive-backed film that may be used in the present disclosure comprises a polymeric film bearing at least one adhesive layer on a back side major surface of the polymeric film. The adhesive layer can comprise a pressure-sensitive adhesive. A pressure-sensitive adhesive is tacky at room temperature and can be applied to a surface to provide an adhesive bond without requiring heat. Manual pressure may be sufficient to create a bond. The adhesive layer is usually covered by a release liner so that the adhesive-backed film can be wound into a roll. The adhesive layer can also comprise a hot-melt adhesive that becomes tacky only upon heating. In such case the adhesive-backed film can be wound into roll without a release layer but a release liner may still be used. The release liner is removed prior to the application of the film. The polymeric film typically is appropriately colored so that the adhesive-backed film can provide the desired paint color effects. The film, in addition, may also have a high-gloss finish so it provides the impression of a continuous glass surface. The film may also have anti-reflective, heat-deflective or heat-absorbing properties.

The polymeric films are typically PVC films, meaning they contain PVC as the major component, for example at least 50% by weight of the polymeric film, of PVC. Suitable films are available, for example, under the trade designation SCOTCHCAL from 3M Company, St. Paul, Minn., USA. Another type of films include, for example, polyurethane (PUR) films, containing PUR as the major component. Examples of suitable PUR films include those described in WO2014/209928, incorporated herein by reference.

The adhesive-backed film is typically provided wound up in a roll. The film is then unwound and the release liner is removed. The film is then placed over the surface to which it is to be applied. Preferably it is held in a stretched position, preferably in down web direction. The film may then be subjected to heat such that the film softens. This may be required for PVC-based films but not for PUR films. Heating, if necessary, can be done, for example by infrared irradiation. Typically a series of parallel infrared irradiators may be used that are arranged over the adhesive-backed film. The softened film is then lowered onto the surface of the car to which it is to be applied. Before the film is applied to the surface of the motor vehicle, the cutting tool guide structure is placed on the surface of the motor vehicle such that the cutting slit is placed on a position where excess film is to be cut off. Several cutting tool guide structure may be placed on the surface of the motor vehicle. Typically, the film is cut off at the tolerance areas of the motor vehicle as will be described below. Therefore, the guide structure are typically placed with the cutting slit over the tolerance areas. The softened adhesive film is applied to the surface and adhered to the surface but excess areas of the film to be cut off are not adhered but are placed over the cutting tool guide structure. A cutting tool is then inserted through the film into the cutting slit. By activating the cutting tool the excess film is cut off with the cutting tool being moved within the cutting slit.

The cutting slit is dimensioned such that it can provide a secure guiding in the cutting direction. Moreover, the cutting tool guide structure has a thickness such that the cutting tool when inserted into the cutting slit cannot reach the surface of the car, preventing the surface of the car to be damaged during the cutting operation. A protective cover may be attached to the cutting tool guide structure underneath the cutting slit as a further protective measure.

The cutting tool may be any suitable device for cutting adhesive films, such as the PVC or PUR films described above. Suitable cutting tools include blades or devices comprising blades, for example knifes or saws, or lasers and wires.

In a preferred embodiment a metal frame is used to apply the adhesive-backed film to the motor vehicle. The frame can be moved over the motor vehicle, or vice versa the motor vehicle can be moved under the frame. The frame contains a mechanism (e.g., several rolls) for unwinding and transporting the film and stretching the film, preferably in down web direction. When the film is unwound and stretched it is held by holding structure (which may be rollers) on the frame structure in its stretched position. The film is then placed over the surface of the car to which it is to be supplied. A series of IR heaters which may be attached to the frame, or are placed elsewhere, and are positioned such that they can irradiate the adhesive-backed film which is underneath the irradiators. Once the film has softened the frame is lowered such that the adhesive-backed film touches the surface to which it is applied. Further rollers, which may be also placed on the frame, or may be used manually, are activated to press the film onto the surface of the car for creating an adhesive bond. In case a hot melt adhesive is used, the adhesive layer can be heat-activated by the IR irradiators or by other heating elements. The surface of the car to which the adhesive-backed film is to be applied is preferably a non-planar, for example, a curved surface, for example the roof panel of a car. Softening of the film is advantageous for the application onto non-planar surfaces. Excess areas of adhesives film are cut off as described above.

The frame and the film transporting mechanism and holding structure can be part of an industrial robot and can be electrically driven and controlled and can be automated. Placing of the guide structure and inserting the cutting tool and also removing the cutting tool and guide structure may also be done electronically, for example in an automated way, for example as part of an industrial robot.

Typically, the adhesive-backed film needs to be cut so that the cut line matches the extension of the car roof. This means in practice that the cut line needs to be applied in a certain tolerance area around at least a part of the circumference of the car roof so that the edge of the adhesive-backed film can be covered and fixed by other parts of the bodywork thereby safely and aesthetically integrating the adhesive-backed film into the overall appearance of the finished car.

The location, width and configuration of the tolerance area depend on the vehicle structure and on which portion of the bodywork the adhesive-backed film is to be applied. For example, the tolerance areas between the sides and the roof of the bodywork of a car essentially correspond to the joint areas of such sides and the roof. In one embodiment, a side panel and the roof panel of the bodywork of a car are arranged to form an overlap joint area that typically has a ditch shape and is usually referred to as roof ditch. Typically that joint area is where side panel and roof panel are welded together. In such embodiment the width of the tolerance area essentially corresponds to the width and/or length of such ditch. In another embodiment the side panel and the roof panel are arranged to form a fillet joint area, and they are joined, for example, by laser welding or laser brazing. In such embodiment the width of the tolerance area corresponds to the width and/or length of the fillet joint area. The tolerance area between the front panel and the roof panel of a bodywork is essentially the area where the front windshield is fixed and sealed to the bodywork. Similarly, the tolerance area between the rear panel and the roof panel of a bodywork is essentially the area where the rear window is fixed and sealed to the bodywork.

It was found that the cutting guiding tool of the present disclosure can be used to achieve cut lines that reliably are within such tolerance areas. Due to the precise positioning of the cutting tool guide structure by its engaging areas on the corresponding surface of the car body, the cutting tool guide structure can be designed such that the cutting slit is positioned over the tolerance area in close proximity to the surface of the motor vehicle or even directly on the surface of the motor vehicle.

DETAILED DESCRIPTION OF THE FIGURES

The disclosure will now be described in more detail with reference to FIG. 1 exemplifying a particular embodiment of the disclosure and to FIG. 2 exemplifying an application frame.

Figure 1:
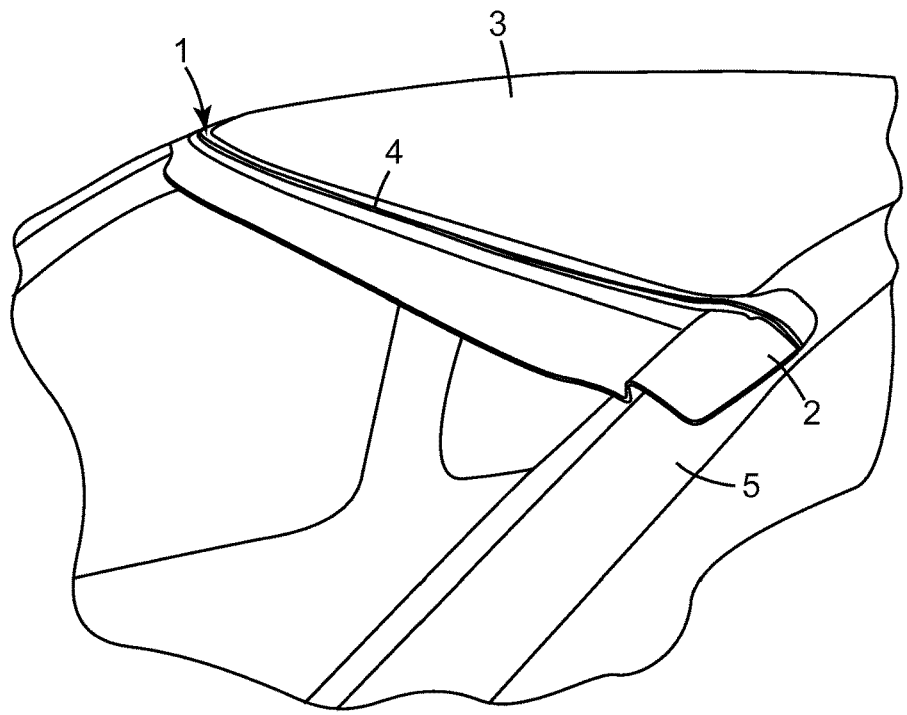
FIG. 1 is a schematic drawing showing a cutting tool guide structure (1) according to the present disclosure containing a cutting slit (4). The guide structure (1) is placed on the roof panel (3) of a car and positioned on opposite parts (5, 5') adjacent to the rear panel (3) of the car.
Figure 2:
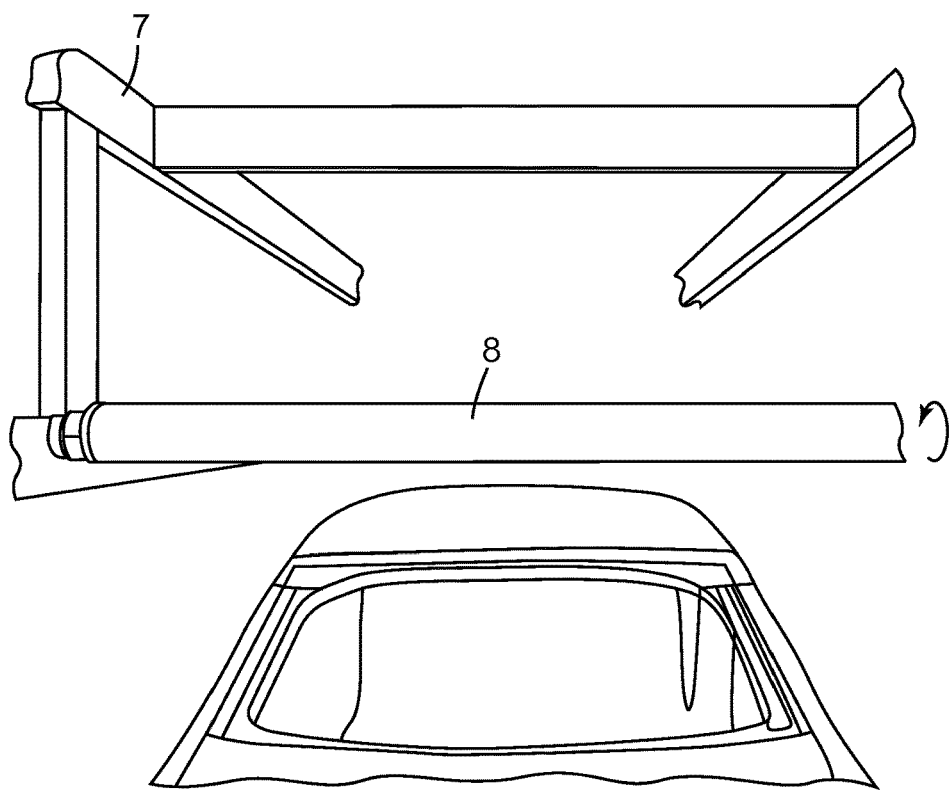
FIG. 2 is a schematic drawing showing an application frame (7) containing a roll of adhesive film (8) placed of the roof of a motor vehicle.

FIG. 1 is a schematic drawing showing a section of a car to which the guide structure is attached. The cutting tool guide structure (1) is attached to the front panel of the car by its engaging areas (2) and (2') of which only the right engaging area (2) is shown. The other engaging area (2') is on the opposite (left) end of the guide structure (1) and is identical to (2) but inverted. The engaging area (2) extends beyond the front section of the car and is bent around the side panel. It is shaped such that it matches the shape of the side panel and front window frame (5). Engaging area (2') at the other end of the guide structure (1) is shaped identically but inverted and matches the receiving surface area (5') (not shown in FIG. 1). The cutting slit (4) of the guide structure (1) extends at least along the front section of the roof panel (3) of the car and is placed over the front tolerance area of the roof panel (3). A roll (8) of adhesive film is inserted onto the guiding bar of an application frame (7) represented in FIG. 2. The frame is placed over the roof panel (3) of the motor vehicle. The adhesive-backed film is rolled out from the guiding bar by a transportation mechanism (not shown in FIG. 2) over the length of the surface (3) of the car to which it is to be applied, for example the roof. The liner is removed during this operation. The rolled out adhesive film is maintained in slight tension in down web direction (by the transportation mechanism or by an additional holding structured (not shown in FIG. 2)). The stretched film may be irradiated by a series of infra red irradiators (which may be attached to the frame (7)) to soften the film. The film is pulled down to the bodywork by lowering the frame (7) until the film contacts the car surface (3). The film is adhered to the curved surface (3). Excess areas of the film are placed over the guide structure (1) and cut off by a cutting tool (6) (e.g. a knife—not shown in FIG. 1) inserted into the cutting slit (4).

FIG. 3 is a schematic drawing showing an embodiment of the cutting tool guide structure (1) that is placed via its two lateral ends between two opposite surfaces of the motor vehicle, which in this case are the side panels (5), (5') of a car. The guide structure is dimensioned such that it fits between the two opposing surfaces (5) and (5') and it has a cutting slit (4) that extends beyond the entire length of the roof panel from position (5) to (5'). The lateral ends may be shaped to from engaging structure (2), (2') to engage the side panels (5), (5'). The embodiment shown in FIG. 3 is made of rubber and is flexible enough to adapt to the bent shape of the roof panel. The embodiment shown in FIG. 3 contains a protective aid (9) for a cutting tool (6).

FIG. 4 is a schematic representation of an enlarged version of the guide structure (1) shown in FIG. 3. The blade (6a) of the blade of cutting tool (6) is inserted into the aperture (9a) of the protective aid (9).

The invention claimed is:

1. Method of applying an adhesive-backed film to the surface of a vehicle and cutting the film, said method comprising the use of a cutting tool guide structure, wherein the cutting tool guide structure is removably attachable to a surface of the vehicle and comprises at least one cutting slit for receiving a cutting tool and being dimensioned such that the cutting tool can be moved back and forth in one direction within the cutting slit to carry out a cutting action, and wherein the guide structure is dimensioned such that it can be placed on or between opposite surfaces of the vehicle, and wherein the method comprises (i) applying the adhesive-backed film on the surface of the vehicle wherein the film extends beyond the surface of the vehicle, wherein the areas of the film that extend beyond the surface are not to be adhered and are to be cut off;

(ii) placing the cutting tool guide structure on or between opposite surfaces of the vehicle such that the cutting slit of the cutting tool guide structure is situated underneath an area of the film that is to be cut off, (iii) placing the unadhered section of the film, which is to be cut off, over the cutting slit of the guide structure;

(iv) inserting a cutting tool into the cutting slit and cutting off the excess film by moving the cutting tool along the cutting slit, wherein (i) can be carried out simultaneously with (ii), prior to (ii) or after (ii).

2. The method of claim 1 wherein the cutting tool guide structure further comprises a protective cutting tool aid, which is inserted into the cutting slit such that it can be moved along the cutting slit in cutting direction, and the cutting tool aid comprises at least one aperture dimensioned to receive at least a part of the cutting tool.

3. The method according to claim 1 wherein the cutting tool guide structure further comprises at opposite ends engaging areas that are shaped and configured such that the cutting tool guide structure can be placed on or between opposite surface areas to provide an abutting fit.

4. The method according to claim 1 wherein the surface of the vehicle is the roof panel of a motor vehicle.

5. The method according to claim 4 wherein the opposite surface areas of the vehicle are selected from side panels, front window frame and rear window frame.

6. The method according to claim 5 wherein the film is an adhesive-backed paint replacement film comprising at least one adhesive layer and at least one colored layer.

7. The method according to claim 1 wherein the opposite surface areas of the vehicle are selected from side panels, front window frame and rear window frame.

8. The method according to claim 1 wherein the film is an adhesive-backed paint replacement film comprising at least one adhesive layer and at least one colored layer.

9. The method according to claim 1 wherein the colored layer of the film comprises a PVC-based or a PUR-based film.

10. The method according to claim 1 wherein the adhesive-backed film has a thickness of from 50 μm to 5 cm.

11. The method according to claim 1 wherein the cutting tool comprises a blade.

12. The method according to claim 1 wherein at least one of (i), (ii), (iii) or (iv) is carried out by a robot.

13. The method of claim 1 wherein applying of the adhesive-backed film on the surface of the vehicle comprises placing the adhesive-backed film over the surface to which it is applied, subjecting the adhesive-backed film to heat until the adhesive-backed film softens, lowering the softened film until it contacts the surface to which it is to be applied and over the cutting slit of the cutting tool guide structure.

14. The method of claim 13 wherein the adhesive-backed film is applied to the surface of the vehicle by means of an application frame comprising at least one transportations mechanism for unwinding and feeding the adhesive-backed film and at least one holding mechanism for keeping the unwound film in a stretched position over the surface of the vehicle to which it is to be applied, wherein the holding mechanism may or may not be the transportation mechanism.

15. The method according to claim 14 wherein at least one of (i), (ii), (iii) or (iv) is carried out by a robot.

16. The method of claim 15 wherein the application frame further comprises at least one infrared irradiator as a heat source to heat and soften the adhesive-backed film.

17. The method of claim 1 wherein the adhesive-backed film is applied to the surface of the vehicle by means of an application frame comprising at least one transportations mechanism for unwinding and feeding the adhesive-backed film and at least one holding mechanism for keeping the unwound film in a stretched position over the surface of the vehicle to which it is to be applied, wherein the holding mechanism may or may not be the transportation mechanism.

18. The method of claim 1 wherein the application frame further comprises at least one infrared irradiator as a heat source to heat and soften the adhesive-backed film.

* * * * *